(12) United States Patent  (10) Patent No.: US 8,154,277 B2
Linder et al.  (45) Date of Patent: Apr. 10, 2012

(54) METHOD AND APPARATUS FOR MEASURING THE THICKNESS OF A METAL LAYER PROVIDED ON A METAL OBJECT

(75) Inventors: Sten Linder, Trosa (SE); Lennart Thegel, Vasteras (SE)

(73) Assignee: ABB AB (SE)

( * ) Notice: Subject to any disclaimer, the term of this patent is extended or adjusted under 35 U.S.C. 154(b) by 0 days.

(21) Appl. No.: 13/235,142

(22) Filed: Sep. 16, 2011

(65) Prior Publication Data

US 2012/0001624 A1  Jan. 5, 2012

Related U.S. Application Data

(63) Continuation of application No. PCT/EP2009/053140, filed on Mar. 17, 2009.

(51) Int. Cl.
*G01B 7/06* (2006.01)
(52) U.S. Cl. .................. 324/229; 324/230; 324/231
(58) Field of Classification Search .......... 324/229–231, 324/239
See application file for complete search history.

(56) References Cited

U.S. PATENT DOCUMENTS

| | | | |
|---|---|---|---|
| 6,040,694 | A | 3/2000 | Becker |
| 2003/0038628 | A1 | 2/2003 | Nath et al. |
| 2007/0090833 | A1 | 4/2007 | Hachtel et al. |
| 2007/0273371 | A1 | 11/2007 | Linder |

FOREIGN PATENT DOCUMENTS

DE  102006025356 A1  12/2007

OTHER PUBLICATIONS

International Preliminary Report on Patentability; Application No. PCT/EP2009/053140; Issued: Jun. 10, 2011; 10 pages.
International Search Report and Written Opinion of the International Searching Authority; Application No. PCT/EP2009/053140; Dec. 9, 2009; 11 pages.
Yang, et al.; "Pulsed Eddy-Current Measurement of a Conducting Coating on a magnetic Metal Plate"; Meas. Sci. Technol. 13 (2002) pp. 1259-1265.
Sethuraman, et al.; "Rapid Inversion of Eddy Current Data for Conductivity and Thickness of Metal Coatings", Journal of Nondestructive Evaluation, Vil. 14. No. 1; 1995; pp. 39-46.

*Primary Examiner* — Bot Ledynh
(74) *Attorney, Agent, or Firm* — St. Onge Steward Johnston & Reens LLC

(57) ABSTRACT

A method and an apparatus for measuring the thickness of a metal layer. The metal layer has a resistivity ($\rho 1$) that differs from the resistivity ($\rho 2$) of the metal object. The apparatus includes a first device arranged to generate a magnetic field in close vicinity of the metal layer, and to generate a variation of the magnetic field so that a current is induced in the surface of the metal layer, a second device arranged to measure the changes of the magnetic field outside the metal layer due to the induced current during a time period that is longer than the time it takes for the current to propagate through the metal layer, and a computing unit to determine the thickness of the layer based on a mathematical relation between the thickness of the layer and the measured values of the changes of the magnetic field.

13 Claims, 3 Drawing Sheets

METHOD AND APPARATUS FOR MEASURING THE THICKNESS OF A METAL LAYER PROVIDED ON A METAL OBJECT

CROSS-REFERENCE TO RELATED APPLICATIONS

The present application is a continuation of pending International patent application PCT/EP2009/053140 filed on Mar. 17, 2009 which designates the United States and the content of which is incorporated herein by reference.

FIELD OF THE INVENTION

The present invention relates to a method and an apparatus for measuring the thickness of a metal layer provided on a metal object, such as a metal sheet or a metal strip. The invention is, for example, suitable for measuring the thickness of metal layers and metal objects made of different types of aluminum alloys.

BACKGROUND OF THE INVENTION

Today, in the production of metal objects, such as a metal sheets and metal strips, it is common to produce objects having a plurality of layers of different metals or metal alloys. An object of a metal alloy can, for example, be protected with a thin film or a layer of another alloy than the object. For example, an aluminum sheet of a certain alloy can be coated with a surface layer of another alloy having good resistance against corrosion. When producing such objects, the production starts from two thicker metal sheets, which are put together and the stacked metal sheets are then rolled to a desired thickness in a rolling mill. A problem with this production method is that the different metal sheets may have different floating properties during deformation and accordingly the sheets are differently compressed during the rolling. Accordingly, producers of such metal sheets have a need of measuring the thickness of the metal layer. Further, there is an interest in measuring the electrical resistivity of the layer in order to understand changes of the material that happen during the rolling process.

The rolling mill includes at least two rolls and a thickness control system that controls the gap between the rolls and hence the thickness of the produced object. For control of the thickness, the thickness of the object is measured at, at least, one point on the strip after rolling, i.e. after the object has passed through the rolls. This measurement is used as input to the thickness control, together with a desired value of the thickness of the object.

SUMMARY OF THE INVENTION

The object of the present invention is to provide a method for measuring the thickness of a metal layer provided on a metal object.

This object is achieved by a method for measuring the thickness of a metal layer provided on a metal object, wherein the metal layer has a resistivity ($\rho 1$) that differs from the resistivity ($\rho 2$) of the metal object.

The method comprises the following steps: generating a magnetic field in close vicinity of the metal layer, generating a variation of the magnetic field so that a current is induced in the surface of the metal layer, measuring the changes of the magnetic field outside the metal layer due to the induced current during a time period that is longer than the time it takes for the current to propagate through the metal layer, and determining the thickness of the layer based on a mathematical relation between the thickness of the layer and the measured values of the changes of the magnetic field.

Metals and metal alloys with different compositions have different resistivity. The present invention utilizes the fact that the depth of penetration in a material of an induced current over time depends on the resistivity of the material, and that the metal layer has a resistivity that differs from the resistivity of the metal object. According to the invention, a time variable magnetic field is generated close to the layer. The time variable magnetic field induces a current in the surface of the layer. The induced current propagates through the layer and into the metal object. The induced current produces a secondary magnetic field. The changes over time of the secondary magnetic field are measured outside the layer while the induced current propagates through the layer and into the metal object. Suitably the changes of the secondary magnetic field are measured by means of a coil. Thus, the changes of the magnetic field are measured by measuring the voltage across the coil.

The magnitude of the magnetic field across the coil depends on the depth of penetration of the induced current. Thus, the magnetic field decreases when the induced current propagates through the material. The depth of penetration at a certain time after the point in time when the current was induced is proportional to the square root of the resistivity of the penetrated material. Accordingly, there is a change in the measured voltage, i.e. in the change of the magnetic field, at the point in time when the induced current passes the boundary between the layer and the object. By utilizing a known mathematical relationship between the changes of the magnetic field, the propagation time, and the resistivity of the propagated material, and a known mathematical relationship between the depth of penetration of the induced current, the propagation time, and the resistivity of the propagated material, it is possible to derive a relation between the thickness of the layer and the measured values of the changes of the magnetic field. According to the invention, this relation can be used to determine the thickness of the layer.

The invention makes it possible to automatically determine the thickness of a metal layer on a metal object. Further, the invention makes it possible to determine the thickness of the layer without being in contact with the layer or the object. Thus, the method according to the invention is suitable for use in the production of products including a metal layer provided on a metal sheet or strip, such as for thickness control of the layer.

Although it is possible to use different types of variations of the magnetic field, it is suitable to generate the variation as a step function in which the magnetic field is suddenly changed to a value that considerably differs from its previous value. The magnetic field can be dropped to a considerably lower value, or the magnetic field can be increased to a considerably higher value. For example, the variation is generated by suddenly allowing the magnetic field to drop to zero. Such a step function is easy to generate and facilitates the calculation of the thickness of the layer.

According to an embodiment of the invention, the method comprises detecting when the measured values of the changes of the magnetic field deviates from expected values of changes of a magnetic field for a homogeneous object with the same resistivity as the layer, and on the basis thereof estimating the time it takes for the induced current to propagate through the layer and reach the boundary between the metal layer and the metal object, and determining the thickness of the layer based on a mathematical relation between the thickness of the layer and the time it takes for the induced current to reach the boundary between the metal layer and the metal object.

By detecting when the measured values of the magnetic field deviates from expected values for a homogeneous object with the same resistivity as the layer, it is possible to determine the time it takes for the induced current to propagate through the layer and reach the boundary between the metal layer and the metal object and accordingly to determine the depth of penetration at the point in time when the current passes the boundary between the layer and the object. The thickness of the layer is determined as the depth of penetration at the point in time when the current passes the boundary between the layer and the object.

According to an embodiment of the invention, the method comprises integrating the measured changes of the magnetic field, and determining the thickness of the layer based on a mathematical relation between the thickness of the layer and the integral of the measured values of the changes of the magnetic field. This embodiment utilizes the fact that the depth of penetration is proportional to the integral of the measured change of the magnetic field. Integrating the measured values is advantageous since it provides stable measuring values and facilitates the understanding of the measuring.

According to an embodiment of the invention, the method comprises determining the point in time when the relation between the integral of the measured change of the magnetic field and the square root of the time deviates from linearity, which is the point in time when the current passes the boundary, and based thereon estimating the time it takes for the induced current to reach the boundary between the metal layer and the metal object. This embodiment utilizes the fact that there is a linear relation between the integral of the change of the magnetic field and the square root of the time after the current was induced in the surface of the metal layer, and that the linear relation depends on the resistivity of the propagated materials.

The depth of penetration is proportional to the integral of the measured change of the magnetic field. Accordingly, the thickness of the layer is proportional to the integral of the measured change of the magnetic field at the point in time when the current passes the boundary between the metal layer and the metal object. By integrating the measured voltage from the point in time when the current was induced, the magnetic field and its changes over time are obtained. If the integrated voltage is represented graphically against the square root of the time, an essentially straight line is obtained as long as the induced current propagates through the layer. The slope of the line is proportional to the resistivity in the layer. When the induced current has penetrated the layer so far that is has reached the boundary between the layer and the object and begins to penetrate the object, the slope of the line in the graphical representation will change.

After some time when the induced current has propagated a portion into the material of the object, an essentially straight line is obtained again, but with a different slope. The slope of this line is proportional to the resistivity of the material of the object. Accordingly, there is a detectable change in the integral of the measured voltage, i.e. in the change of the magnetic field, at the point in time when the current passes the boundary between the layer and the object. This change makes it possible to determine the integral of the measured change of the magnetic field at the point in time when the current passes the boundary between the metal layer and the object. The thickness of the layer is calculated based on the integral of the measured change of the magnetic field at the point in time when the current passes the boundary between the metal layer and the metal object and a predetermined constant.

According to an embodiment of the invention, the method comprises determining the point in time when the relation between the integral of the measured change of the magnetic field and the square root of the time deviates from linearity, which is the point in time when the current passes the boundary, and based thereon determining the integral of the measured change of the magnetic field at the point in time when the current passes the boundary. According to this embodiment it is detected when the measured values of the changes of the magnetic field deviates from expected values of changes of a magnetic field for a homogeneous object by detecting when the relation between the integral of the measured change of the magnetic field and the square root of the time deviates from linearity. An advantage with this embodiment is that it is easy to detect when the measured values deviate from linearity.

According to an embodiment of the invention, the method comprises determining the integral value ($Iu(t\delta)$) when the relation between the integral of the measured change of the magnetic field and the square root of time deviates from linearity and based thereon estimating the thickness of the layer as proportional to the determined integral value.

According to an embodiment of the invention, the method comprises: calculating the line of the integral of the measured change of the magnetic field, when plotted against the square root of the time after the current was induced in the surface of the metal layer and before the variation of the magnetic field has propagated through the metal layer, calculating the line of the integral of the measured change of the magnetic field, when plotted against the square root of the time after the current was induced in the surface of the metal layer and after the variation of the magnetic field has propagated through the metal layer, and determining the integral of the measured change of the magnetic field at the point in time when the current passes the boundary between the metal layer and the metal object as the point of intersection between the line of the integral of the change of the magnetic field before the variation of the magnetic field has propagated through the metal layer and the line of the integral of the change of the magnetic field after the variation of the magnetic field has propagated through the metal layer.

According to an embodiment of the invention, the method comprises determining the resistivity of the metal layer based on the measured changes of the magnetic field before the variation of the magnetic field has propagated through the metal layer. In some applications there is a desire to determine the resistivity of the layer and/or the resistivity of the object. According to an embodiment of the invention, the method comprises determining the resistivity of the metal object based on the measured change of the magnetic field after the variation of the magnetic field has propagated through the metal layer. Due to the fact that the measured voltage is proportional to the square root of the resistivity, it is possible to determine the resistivity of the layer and the object using the same measurement values that are used for determining the thickness of the layer. Further, it is an advantage to determine the resistivity of the layer and the object and use the determined resistivity to facilitate the calculations of the thickness of the layer.

According to an embodiment of the invention, the method comprises integrating the measured changes of the magnetic field, detecting when the integrated measured values deviate from expected integrated values of changes of a magnetic field for a homogeneous object with the same resistivity as the layer and, on the basis thereof, determining the integral of the measured change of the magnetic field at the point in time when the current passes the boundary, and determining the thickness of the layer based on the integral of the measured change of the magnetic field at the point in time when the current passes the boundary between the metal layer and the metal object.

Another object of the present invention is to provide an apparatus for measuring the thickness of a metal layer provided on a metal object.

Such an apparatus comprises a first device arranged to generate a magnetic field in close vicinity of the metal layer, and to generate a variation of the magnetic field so that a current is induced in the surface of the metal layer, a second device arranged to measure the changes of the magnetic field outside the metal layer due to the induced current during a time period that is longer than the time it takes for the current to propagate through the metal layer, and a computing unit configured to receive the measured changes of the magnetic field and to determining the thickness of the layer based on a mathematical relation between the thickness of the layer and the measured values of the changes of the magnetic field.

BRIEF DESCRIPTION OF THE DRAWINGS

The invention will now be explained more closely by the description of different embodiments of the invention and with reference to the appended figures.

DETAILED DESCRIPTION OF THE INVENTION

Figure 1:
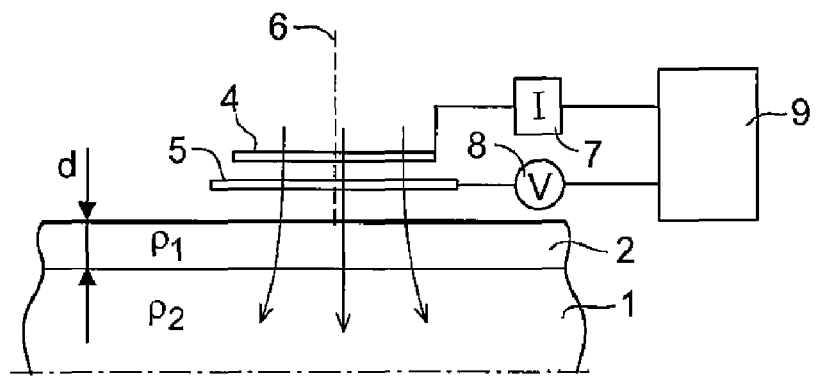
FIG. 1 shows an example of an apparatus for measuring the thickness of a metal layer on a metal object according to the invention.

FIG. 1 shows and apparatus for measuring the thickness of a metal layer 2 on a metal object 1 according to an embodiment of the invention. The object 1 is made of metal or a metal alloy and is provided with a layer 2 of a metal or a metal alloy having a resistivity that differs from the resistivity of the object. The layer is thin compared with the thickness of the object. The layer is, for example, between 0.1 mm and 1 mm.

The object 1 is, for example, a sheet and the layer can be provided on one side or both sides of the sheet. The thickness d of the layer 2 is to be measured.

The apparatus comprises a first device arranged to generate a magnetic field and positioned close to the metal layer. The first device includes a coil 4, in the following called a sending coil, and current supply means 7 for supplying a current to the sending coil 4. The first device is arranged to generate a magnetic field and a sudden variation of the magnetic field so that a current is induced in the surface of the layer 2. The variation of the magnetic field is generated by generating a variation of the current supplied to the sending coil 4. The apparatus further comprises a second device arranged to measure the changes of the magnetic field outside the metal layer due to the induced current. The second device comprises a coil 5, in the following called a receiving coil, and measuring equipment 8 for measuring the voltage across the receiving coil. The coils 4 and 5 are arranged on the same side of the object as the layer 2.

The apparatus further comprises a computing unit 9 configured to receive the measured voltage across the receiving coil 5 and to determine the thickness of the layer based on the measurement values from the measurement equipment 8. The measurement values are stored together with the point in time at which the measurement values were taken. Thus, it is possible to calculate the time from the variation was generated until the measured values were taken.

Figure 2:
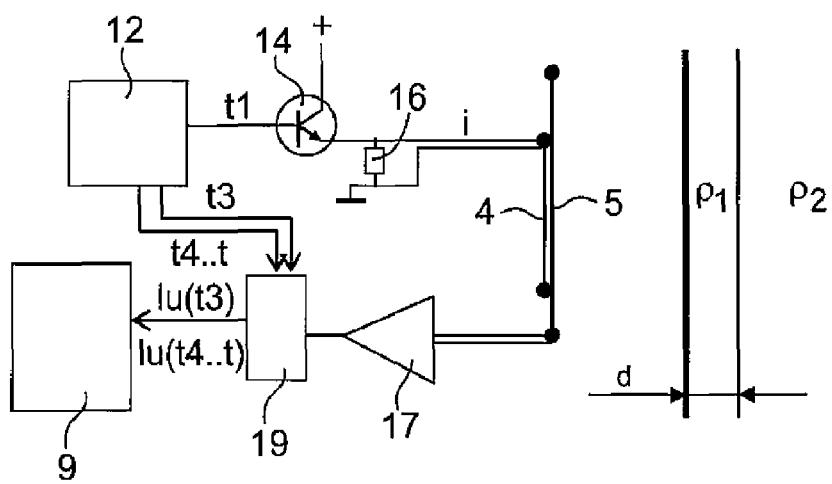
FIG. 2 shows another example of an apparatus for measuring the thickness of a metal layer on a metal object according to the invention.

FIG. 2 shows another example of an apparatus for measuring the thickness of a metal layer on a metal object according to the invention. The apparatus comprises a control circuit 12 arranged to control the current supplied to the sending coil 4. The control circuit 12 is connected to the base of a transistor 14, which is connected to the sending coil 4. The opposite end of the sending coil 4 is connected to earth. The transistor 14 is arranged for supplying a constant current through the sending coil and to earth. Further the transistor 14 is arranged to enable a fast change of the current from one level to another, for example to turn off the current. The transistor is controlled by the control circuit 12, which advantageously is digital. Alternatively, more than one transistor can be arranged between the control circuit and the sending coil. The apparatus further comprises a discharge resistor 16 arranged over the sending coil 4. The transistor turns off immediately but for a short while a current flows through the discharge resistor 16. The time for complete decay of the current is determined by the resistor 16. The measuring equipment for measuring the voltage across the receiving coil 5 comprises a differential amplifier 17, and an AD-converter 19. The output from the AD-converter 19 is transferred to the computing unit 9.

The sending coil 4 and the receiving coil 5 are arranged close to the layer 2 and preferably with their centre axes 6 directed perpendicular to the surface of the layer. In a preferred embodiment the sending coil 4 is arranged so that the centre axis of the sending coil is co-axial with the centre axis of the receiving coil. However, it is also possible to use other positions of the sending coil and the receiving coil as long as the receiving coil senses changes over time of the magnetic field caused by the layer and the object. The distance between the sending coil 4 and the layer 2 depends on the measuring situation. A small measuring distance provides a good measuring result, but on the other hand it can be difficult to keep a small distance due to the fact that the object with the layer is moving. This means that in practice it is suitable for the measuring distance to be between 3 and 30 mm.

The size of the sending coil 4 and the number of turns also depends on the measuring situation, such that when thin layers are measured the inductance of the coil should be small and when thick layers are measured the inductance of the coil should be large. This means in practice that when measuring thin layers the number of turns of the coil is from a few turns and up to about ten turns, and when measuring thick layers the number of turns is about ten times as many. The number of turns of the receiving coil is mainly the same as the number of turns of the sending coil. The second device may include one or more receiving coils in order to achieve certain effects. For example, it is possible to arrange the receiving coil 5 with a plurality of coils in order to achieve that the apparatus will be independent of the distance to the layer. In another embodiment the same coil can be used as sending and receiving coil.

Figure 3:
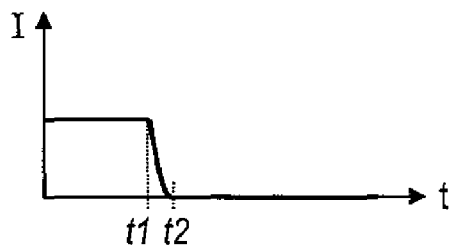
FIG. 3 shows an example of the current through a sending coil when generating a variation of the magnetic field.

FIG. 3 shows an example of the current in the sending coil 4. A constant current is fed through the sending coil 4 for a period of time which is long enough for the magnetic field generated around the sending coil to penetrate the layer 2 and at least a part of the object 1, and the magnetic field becomes stable. Thereafter, at a start time t1, the current is suddenly changed from one value to another value. In the example shown in FIG. 2, the variation is generated by suddenly turning off the current through the sending coil. The current is turned off at a time t1. Due to the inductance of the sending coil and the resistance of the discharge resistor the current in the sending coil is not immediately turned off. At a point in time t2 the current in the sending has dropped to zero.

Figure 4:
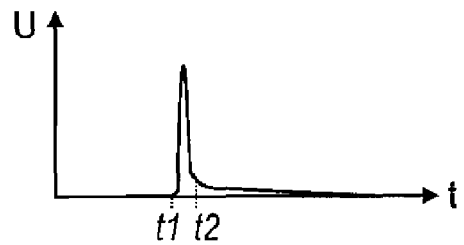
FIG. 4 shows the voltage across a receiving coil due to the generated variation of the magnetic field.

FIG. 4 shows the measured voltage across the receiving coil 5 due to the generated variation of the magnetic field shown in FIG. 3. As shown in the figure there is a peak in the measured voltage between the times t1 and t2. The measured voltage before the time t2 is not used for determining the thickness of the layer. At the time t2 there is no longer any magnetic field generated by the sending coil as no current is flowing through the sending coil. However, the change in the magnetic field has induced a current in the surface of the layer 2. This current will be surrounded by a magnetic field which will also surround the receiving coil 5. The strength of the magnetic field at the receiving coil depends on the strength on the current induced in the layer and the distance between the current and the receiving coil.

It is important to reduce the time period t1 from the point in time when the current was turned off until the point in time t2 when the current through the coil is zero. This is particularly important when thin layers are measured. When measuring thin layers the time from the current was turned off and until the current through the coil is zero should be less than 0.1 μs. This is the time between t1 and t2 as shown in FIG. 3. At the time t2 the current through the sending coil has ceased and the measuring of the thickness of the layer can begin. FIG. 4 shows the measured voltage across the receiving coil due to the generated variation of the magnetic field shown in FIG. 3. As shown in the figure there is a peak in the measured voltage between the times t1 and t2. The measured voltage before the time t1 is not used for determining the thickness of the layer.

It is a well known fact that if the magnetic field over the receiving coil changes a voltage is induced in the receiving coil. The induced voltage is u(t) according to the following formula:

$$u(t) = C1 \cdot \frac{dB_{coil}(t)}{dt} \quad (1)$$

$B_{coil}(t)$ is the magnetic field in the direction of the axis of the coil integrated over the surface of the coil. C1 is a constant that depends on the number of turns of the coil.

Figure 6:
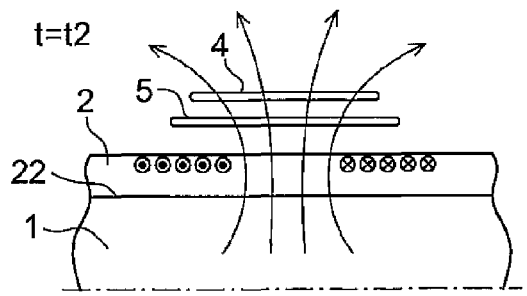
FIG. 6 shows the current induced in the surface of a metal layer due to a generated variation of the magnetic field.
Figure 7:
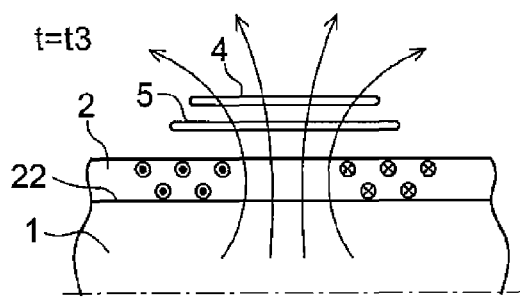
FIG. 7 shows the induced current moving towards the boundary between the layer and the object.

FIG. 6 shows the current induced in the surface of the metal layer due to the generated variation of the magnetic field at the time t2. At the time t2 the current is only induced in the surface of the layer. FIG. 7 shows the induced current at a time t3. At this time the current is penetrating the layer and is moving towards the boundary 22 between the layer and the object. When the induced current move towards the boundary 22, the magnetic field at the receiving coil is changed. The change of the magnetic field can be calculated, for example, by means of Maxwell's equations. If the magnetic field that was applied by the sender coil was mainly constant over the layer, the magnetic field at the receiving coil can be described as:

$$B_{coil}(t) = C3 + C2 \cdot \sqrt{\rho 1 \cdot t} \quad (2)$$

t is the time passed since the variation of the magnetic field was generated,
ρ1 is the resistivity of the layer, and
C3, C2 are constants.

The voltage across the receiving coil is the change of the magnetic field over the receiving coil. By derivating formula 2, the voltage across the receiving coil can be determined:

$$u(t) = \frac{C1 \cdot C2}{2} \cdot \sqrt{\frac{\rho 1}{t}} \quad (3)$$

u(t) is the measured voltage at the time t passed since the variation of the magnetic field was generated.

If the voltage is measured at a point in time t3, the time t passed since the variation of the magnetic field was generated is t3–t2.

From the expression 3 above the square root of the resistivity of the layer can be determined as:

$$\sqrt{\rho 1} = \frac{2}{C1 \cdot C2} \cdot u(t3) \cdot \sqrt{t3 - t2} \quad (4)$$

u(t3) is the measured voltage at the time t3.
t2 is the point in time when the current was induced in the layer.

The constant 2/[C1·C2] can be determined by measuring at time t3 on a homogeneous material with known resistivity and applying expression 3.

From formula 10 it is possible to determine the resistivity of the layer based on the measured voltage at the time t3.

As long as the current induced travels through the layer and accordingly the change of the magnetic field only occurs in the layer, the measured voltage will follow the time relation according to expression 3 above. However, when the current penetrates the boundary 22 between the layer and the object, the measured voltage will no longer follow the expression 3, as the resistivity ρ2 of the object is different from the resistivity ρ1 of the layer. When the induced current has penetrated deep into the object and accordingly after a rather long time the measured voltage is described by the following relation:

$$u(t) = \frac{C1 \cdot C2}{2} \cdot \sqrt{\frac{\rho 2}{t}} \quad (5)$$

ρ2 is the resistivity of the object.

Figure 8:
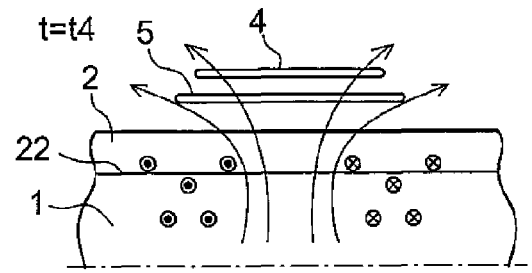
FIG. 8 shows the induced current passing through the boundary between the layer and the object and moving through the object.

FIG. 8 shows the induced current passing through the boundary 22 between the layer 2 and the object 1 and moving through the object.

Figure 5:
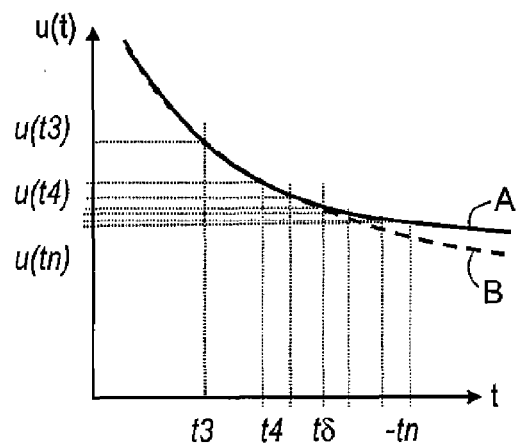
FIG. 5 shows an example of the measured voltage across the receiving coil for a layer with a resistivity that differs from the resistivity of the object compared to expected values of the voltage for a homogenous object with the same resistivity as the layer.

FIG. 5 shows how the voltage across the receiving coil varies as a function of time for a homogeneous object with the same resistivity as the layer, the dashed curve marked with an B, and how the voltage across the receiving coil varies as a function of time for an object with a layer of a different resistivity, the curve marked with A. The curves overlap until the point in time tδ when the induced current crosses the boundary between the layer and the object. Curve B deviates from curve A at the point in time tδ due to the difference in resistivity between the layer and the object. By comparing the measured voltage values with calculated values of the voltage for a homogenous object with the same resistivity as the layer it is possible to detect when the curved deviates and accordingly to determine the point in time tδ when the induced current crosses the boundary between the layer and the object.

By inserting the square root of the resistivity according to formula 4 in the expression for the voltage according to formula 3, it is possible to calculate a voltage–time relation for the case of a homogenous object with the same resistivity as the layer, as described by the curve B.

$$u(tn) = u(t3) \cdot \sqrt{\frac{t3-t2}{tn-t2}} \qquad (6)$$

At a suitable time after t3, before the change due to the border between the layer and the object occurs, an automatic collection of measuring values with preferably a constant step length, from the time t3 until to is started. According to a first embodiment of the invention, a deviation between the collected measurement value and a value calculated from formula 6 is calculated for each measurement value. When this deviation becomes larger than a predefined limit value, the time from t3 is stored as a measure of the time it takes for the current to penetrate the layer and reach the boundary between the layer and the object. This time is denoted tδ.

In the same way as in connection with the expressions 3 and 4 it is possible to calculate by means of Maxwell's equations the depth of penetration δ of the induced current in an electrically conducting material at a certain moment after the variation of the applied magnetic field occurred. The depth of penetration δ in the layer can be calculated as:

$$\delta = C4 \cdot \sqrt{\rho 1 \cdot t} \qquad (7)$$

C4 is a constant, and C4 is in the order of 100 if the resistivity is given in nOHmm, d is given in μm, and the time in μs.

If the expression 4 is inserted in the expression 7, and the time t is tδ–t2, it is possible to calculate the depth of the induced current at the time tδ when the current penetrates the boundary between the layer and the object, and accordingly the thickness d of the layer.

$$d = \delta = \frac{2C4}{C1 \cdot C2} \cdot u(t3) \cdot \sqrt{t3-t2} \cdot \sqrt{t\delta - t2} \qquad (8)$$

t2 is the point in time when the current was induced in the layer.

tδ is the time it takes for the current to reach the boundary between the layer and the object.

The constant 2C4/[C1·C2] can be determined in different ways. One way is to determine the constant theoretically. It is also easy to determine the constant by measuring. A measure can be done on a material with a layer of a known thickness.

The expression 8 describes a mathematical relation between the thickness of the layer d, a measured value u(t3) of the changes of the magnetic field outside the metal layer at a point in time t3, and the time it takes for the current to reach the boundary between the layer and the object.

According to a preferred embodiment of the invention, the measurement signals are integrated. It has proven that it is very suitable to integrate the signal from the receiving coil before using it to calculate the thickness and resistivity of the layer. The integration provides more stable measurement values and facilities the understanding of the measurement.

Figure 9:
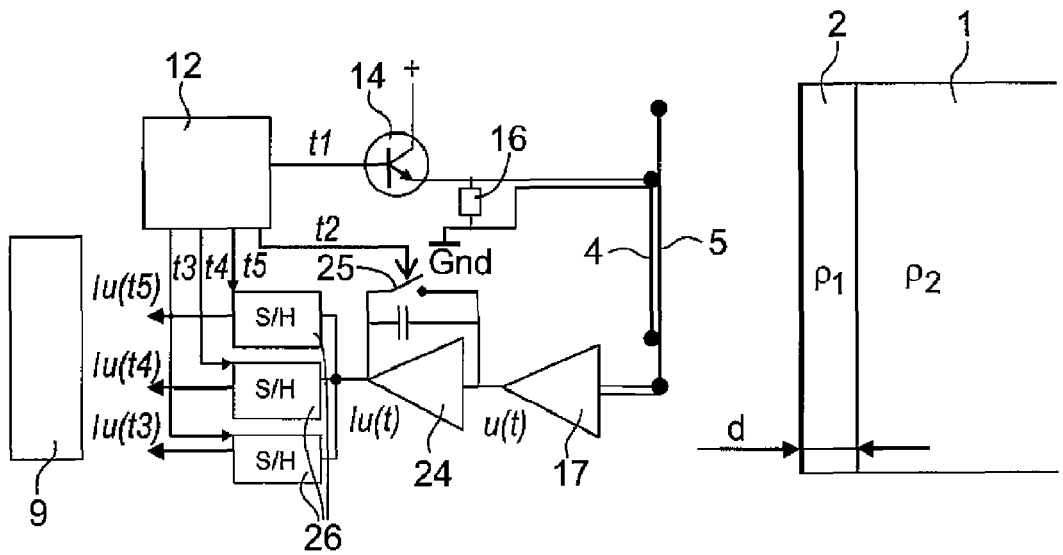
FIG. 9 shows a further example of an apparatus for measuring the thickness of a metal layer on a metal object.

FIG. 9 shows an example of an apparatus for measuring the thickness of a metal layer on a metal object, which is suitable for implementing this embodiment of the invention. In this embodiment the current supply to the sending coil is arranged in the same way as the embodiment shown in FIG. 2. The receiving coil 5 is connected to a differential amplifier 17 as in the embodiment disclosed in FIG. 2. This apparatus differs from the apparatus disclosed in FIG. 2 in that it comprises an integrator 24 connected between the computing unit 9 and the differential amplifier 17. The measurement signal u(t) from the receiving coil is integrated with the beginning at the time t2. This is done by means of a switch 25, which is arranged such that the integrator 24 is inactivated and set to zero when the switch is closed, and the integrator is activated when the switch is opened. The switch is closed until the time t2. At the time t2 the switch is opened and the integration begins. The signal after the integrator is measured at three points in time t3, t4 and t5. The apparatus comprises three sample-and-hold amplifiers 26. The three measurements are carried out by measuring the signal at corresponding points in time in the three sample-and-hold amplifiers 26. Three measuring values Iu(t3), Iu(t4) and Iu(t5) are used for calculating the thickness of the layer and the resistivity of the layer and possibly also for the object. The calculations are carried out in the computing unit 9, which, for example, is a PC computer.

The measured voltage across the receiving coil when the induced current travel through the layer is described by formula 3. By integrating formula 3 from the point in time t2 until t the integrated voltage Iu(t) is described with the following formula, f the time difference between t1 and t2 is so small that t1 and t2 is mainly the same time:

$$Iu(t) = \int_{t2}^{t} u(t)dt = C1 \cdot C2 \cdot \sqrt{\rho 1 \cdot (t-t2)} \qquad (9)$$

As this expression is the same as the expression for depth of penetration δ, except for constants, the integrated voltage Iu(t) is proportional to δ. The integrated voltage is thus a measure of how deep the induced current has penetrated into the material. According to this embodiment of the invention, the integrated voltage Iu(t) is measured at a time t3, and if the turning off of the current has been very fast, the time since the variation of the current to the sender coil is t3–t2. From the above expression 6 it is possible to determine the square root of the resistivity of the layer by the formula:

$$\sqrt{\rho 1} = \frac{1}{C1 \cdot C2} \cdot \frac{Iu(t3)}{\sqrt{t3-t2}} \qquad (10)$$

The constant 1/[C1·C2] can be determined by measuring on a metal sheet with known resistivity.

From formula 10 it is possible to determine the resistivity of the layer based on the integral of the measured voltage at a time t3.

As long as the change of the magnetic field stays in the layer, the integrated voltage will follow the time relation according to formula 9. However, when the induced current has penetrated the boundary 22 between the layer and the object this relation will be changed. When the induced current has penetrated deep into the base material of the object, the integrated voltage will be described by the following relation:

$$Iu(t)=C1 \cdot C2 \cdot \sqrt{\rho 2 \cdot (t-t2)} \qquad (11)$$

ρ2 is the resistivity of the object. By combining formulas 9 and 10 a time relation for a homogenous object of the same resistivity as the layer is achieved:

$$Iu(t) = Iu(t3) \cdot \sqrt{\frac{t-t2}{t3-t2}} \qquad (12)$$

Figure 10:
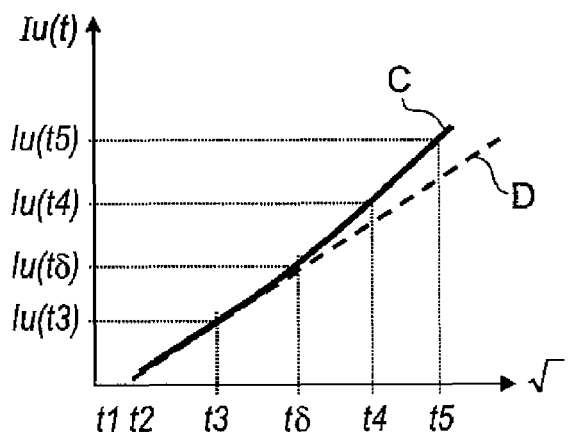
FIG. 10 shows the integral of the measured voltage across the receiving coil for an object with a layer of a different resistivity compared to expected values of the integral of the voltage for a homogenous object with the same resistivity as the layer.

FIG. 10 illustrates what happens when the induced current penetrates the boundary between the layer and the object, by showing the integrated measured voltage as function of the square root of the time. As seen from formula 12 there is a linear relationship between the integrated voltage and the square root of the time. The dashed line, labelled D, shows calculated values of the integral of the voltage for a homogenous object with the same resistivity as the layer. The curve labelled C shows an integrated voltage signal measured on an object covered with a layer of a resistivity that differs from the material of the object. As seen from the figure, the first part of the curve C has a slope that differs from the second part of the curve. The slope of the first part of the curve C is proportional to the square root of the resistivity ρ1 of the layer, and the slope of the second part of the curve C is proportional to the square root of the resistivity ρ2 of the object.

The measurement times t4 and t5 are chosen such that the induced current has penetrated the boundary between the layer and the base material and a part of the material of the object. At those times the integrated voltage is linear to the square root of the time, but with a slope that is proportional to the square root of the resistivity ρ2 of the object. The point of intersection between the line passing through the points Iu(t4)/t4 and Iu(t5)/t5 and the line calculated according to formula 12 provides the point in the diagram at which the induced current penetrates the boundary between the layer and the object. By combining formula 7 and formula 10, the depth of penetration δ for the induced current, and accordingly the thickness d of the layer, can be determined according to the following expression:

$$d = \delta = \frac{C4}{C1 \cdot C2} \cdot \frac{Iu(t3)}{\sqrt{t3-t2}} \cdot \sqrt{t\delta - t2} \qquad (13)$$

tδ is the point in time when the induced current penetrates the boundary between the layer and the object. The point in time tδ can be determined as the point in time when the relation between the integral of the measured change of the magnetic field and the square root of time deviates from linearity.

As the integrated voltage Iu(t) is proportional to the penetration depth δ, the value of the integrated voltage Iu(tδ) at the intersection point tδ is proportional to the thickness d of the layer. Thus, the thickness d of the layer is proportional to the determined integral value at the time tδ when the current penetrates the boundary:

$$d=C5 \cdot Iu(t\delta) \qquad (14)$$

Iu(tδ) is the integral of the measured voltage at the time tδ.

The constant C5 can be determined by measuring an object with a layer of known thickness.

For example, Iu(tδ) is determined as the integral value when the relation between the integral of the measured change of the magnetic field and the square root of time deviates from linearity, as shown in FIG. 10, and the thickness d of the layer is estimated based thereon. This embodiment is simpler than the one using expression 13 since it is not necessary to determine the point in time tδ when the induced current penetrates the boundary between the layer and the object.

In order to provide an accurate measurement of the thickness of the layer, the material of the object must be thick in relation to the layer, at least three times as thick as the layer and the time t4 must be measured a long time after the induced current has passed through the boarder, suitably more than five times the time it takes to penetrate the layer. However, it is possible to use the method according to the invention also for cases when those demands are not fulfilled.

The time t3 should be chosen so that the induced current has not yet penetrated the layer. Further the point in times t4 and t5 should be chosen so that induced current has well penetrated the boundary between the layer and the object. This requires that it is known during the measurement at least approximately when the induced current penetrates the boundary. In many cases the approximate thickness of the layer is known in advance, but it is desired to determine the thickness with a higher accuracy. In those cases it is possible to use the previously measured approximate measure of the thickness to determine the times t3, t4 and t5. In a first measurement the integrated voltage is measured at the time t3 which is as short as possible and from this measurement the square root of the resistivity of the layer is calculated from the formula 4 by means of the estimated penetration time, the times t4 and t5 are determined and the sample-and-hold amplifiers are adjusted accordingly. If the approximate value of the thickness of the layer is not known, the time t3 is selected as short as possible in a first measurement and the points in time t4 and t5 are selected as late as possible. From the corresponding measurement values on the integral of the voltage, a first value for the time of penetration is calculated according to a formula 13. This calculated value on the time of penetration is used as a setting value for the other times.

The form of the relation in between the integrated voltage and square root of time can be calculated for times just somewhat longer than tδ. Such calculations can, although complicated, then be used to determine d even when t4 and t5 is selected directly after tδ.

In the following a further embodiment of the invention is disclosed. In this embodiment the resistivity ρ1 of the layer is known in advance. The resistivity can be known due to the fact that the composition of the material is know, or by measuring the resistivity before applying the layer on the object. Further, the resistivity of the material of the object is known in advance. If the known resistivity of the layer is inserted to the expression 3 and the constant C1·C2 is known, a voltage–time relation can be calculated for the case of a homogenous object with the same resistivity as the layer. At a suitable time t4, after the point in time when the induced current has passed the boarder between the layer and the object, a value of the integrated voltage is measured and the thickness d of the layer is calculated based on the integrated measured signal Iu(t4), the time of the measurement t4, and the resistivity ρ1 of the layer and the resistivity ρ2 of the object according to the following relation:

$$d = Iu(t4) - \sqrt{Iu(t4)^2 - \frac{\rho 2 \cdot t4 - Iu(t4)^2}{\frac{\rho 2}{\rho 1} - 1}} \quad (15)$$

The time t4 is chosen so that it is longer than the time it takes for the current to penetrate the boarder between the layer and the object, i.e. longer than the time at which the measured voltage values start to deviate from calculated values for a homogenous object with the same resistivity as the layer.

The present invention is not limited to the embodiments disclosed but may be varied and modified within the scope of the following claims. For example, other mathematical relations between the thickness of the layer and the measured values than those described above can be used to determine the thickness of the layer.

What is claimed is:

1. A method for measuring the thickness of a metal layer provided on a metal object, wherein the metal layer has a resistivity (ρ1) that differs from the resistivity (ρ2) of the metal object, and the method comprises:
    generating a constant magnetic field in close vicinity of the metal layer,
    generating a sudden variation of the magnetic field so that a current is induced in the surface of the metal layer,
    measuring the changes of the magnetic field outside the metal layer due to the induced current during a time period that is longer than the time it takes for the current to propagate through the metal layer,
    detecting when the measured values of the changes of the magnetic field deviate from expected values of changes of a magnetic field for a homogeneous object with the same resistivity as the layer, and, on the basis thereof, estimating the time it takes for the induced current to propagate through the layer and reach the boundary between the metal layer and the metal object, and
    determining the thickness (d) of the layer based on a mathematical relation between the thickness of the layer and the time it takes for the induced current to reach the boundary between the metal layer and the metal object.

2. The method according to claim 1, wherein said variation is generated as a step function in which the magnetic field is suddenly changed to a value that considerably differs from its previous value.

3. The method according to claim 1, wherein said variation is generated by suddenly allowing the magnetic field to drop to zero.

4. The method according to claim 1, wherein the changes of the magnetic field are measured by measuring the voltage across a coil positioned close to the layer.

5. The method according to claim 1, wherein the method comprises integrating the measured changes of the magnetic field, and determining the thickness (d) of the layer based on a mathematical relation between the thickness of the layer and the integral of the measured values of the changes of the magnetic field.

6. The method according to claim 5, wherein the method comprises determining the integral value (Iu(tδ)) when the relation between the integral of the measured change of the magnetic field and the square root of time deviates from linearity and based thereon estimating the thickness of the layer as proportional to the determined integral value.

7. The method according to claim 5, wherein the method comprises determining the point in time (tδ) when the relation between the integral of the measured change of the magnetic field and the square root of the time deviates from linearity, which is the point in time when the current passes the boundary, and based thereon estimating the time it takes for the induced current to reach the boundary between the metal layer and the metal object.

8. The method according to claim 1, wherein the method comprises determining the resistivity of the metal layer based on the measured changes of the magnetic field before the variation of the magnetic field has propagated through the metal layer.

9. An apparatus for measuring the thickness of a metal layer provided on a metal object, wherein the metal layer has a resistivity (ρ1) that differs from the resistivity (ρ2) of the metal object, characterized in that the apparatus comprises:
    a first device arranged to generate a constant magnetic field in close vicinity of the metal layer, and to generate a sudden variation of the magnetic field so that a current is induced in the surface of the metal layer,
    a second device arranged to measure the changes of the magnetic field outside the metal layer due to the induced current during a time period that is longer than the time it takes for the current to propagate through the metal layer, and
    a computing unit configured to receive the measured changes of the magnetic field and to detect when the measured values of the changes of the magnetic field deviate from expected values of changes of a magnetic field for a homogeneous object with the same resistivity as the layer, and, on the basis thereof, to estimate the time it takes for the induced current to propagate through the layer and reach the boundary between the metal layer and the metal object, and to determine the thickness (d) of the layer based on a mathematical relation between the thickness of the layer and the time it takes for the induced current to reach the boundary between the metal layer and the metal object.

10. The apparatus according to claim 9, wherein said first device comprises a coil supplied with a time variable current and the first device is arranged to generate said variation by suddenly changing the current supplied to the coil.

11. The apparatus according to claim 9, wherein said second device comprises a coil and the second device is arranged to measure the changes of the magnetic field across the coil by measuring the voltage across the coil.

12. The apparatus according to claim 9, wherein the apparatus comprises an integrator arranged to integrate the measured changes of the magnetic field, and the computing unit is configured to receive the integrated measured changes of the magnetic field, and to determine the thickness (d) of the layer based on a mathematical relation between the thickness of the layer and the integral of the measured values of the changes of the magnetic field.

13. The apparatus according to claim 9, wherein the computing unit configured to determine the resistivity of the metal layer based on the measured changes of the magnetic field before the variation of the magnetic field has propagated through the metal layer.

* * * * *